No. 813,343. PATENTED FEB. 20, 1906.
A. D. BARTLETT.
SHUTTER FASTENER.
APPLICATION FILED AUG. 19, 1905.
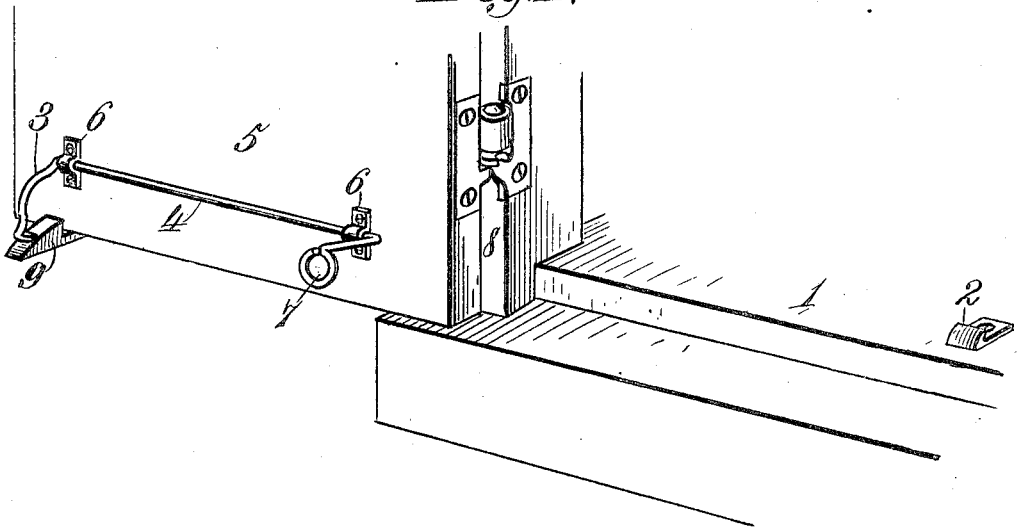
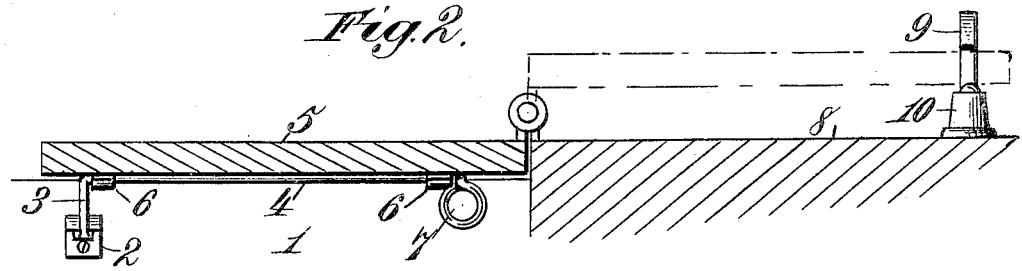
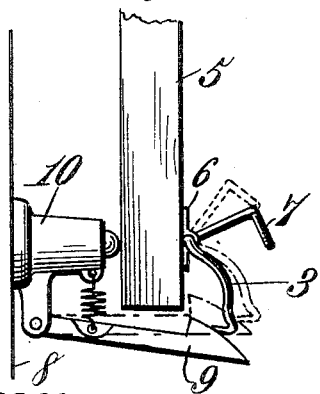
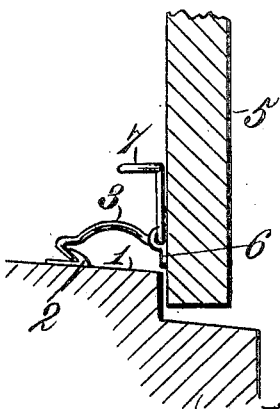
Witnesses,
Inventor,
Albert D. Bartlett.

UNITED STATES PATENT OFFICE.

ALBERT D. BARTLETT, OF HAMPTON, VIRGINIA.

SHUTTER-FASTENER.

No. 813,343.  Specification of Letters Patent.  Patented Feb. 20, 1906.

Application filed August 19, 1905. Serial No. 274,888.

*To all whom it may concern:*

Be it known that I, ALBERT D. BARTLETT, a citizen of the United States, residing at Hampton, in the county of Elizabeth City and State of Virginia, have invented new and useful Improvements in Shutter-Fasteners, of which the following is a specification.

This invention relates to shutter-fasteners; and the object thereof is to provide a shutter-fastener in a manner as hereinafter referred to, comprising means carried by the shutter and acting as a latch for retaining the shutter in a closed position, and, furthermore, acting as a means for conveniently releasing the shutter when held in an open position, so that the shutter can be readily moved to and retained in closed position.

The invention further aims to provide a shutter-fastener which shall be simple in its construction, strong, durable, efficient in its use, easily and conveniently operated, and comparatively inexpensive to manufacture.

With the foregoing and other objects in view the invention consists of the novel construction, combination, and arrangement of parts hereinafter more specifically described, and illustrated in the accompanying drawings, which form a part of this specification, and wherein is shown the preferred embodiment of the invention; but it is to be understood that changes, variations, and modifications can be resorted to which come within the scope of the claims hereunto appended.

In the drawings, wherein like reference characters denote corresponding parts throughout the several views, Figure 1 is a perspective view showing the adaptation of the shutter-fastener in accordance with this invention with the shutter open. Fig. 2 is a sectional view of the shutter closed. Fig. 3 is a view in elevation, showing the spring-catch thrown to release the shutter from open position; and Fig. 4 is a section showing the shutter fastened.

Referring to the drawings by reference characters, 1 denotes the window-sill, provided with a keeper 2, which is adapted to be engaged by the curvilinear hooked end 3 of the combined retaining and releasing lever 4. When the hooked end 3 is in engagement with the keeper 2, the shutter 5 is retained in a closed position. The shutter 5 is provided near its lower end with a pair of eyes 6, in which is loosely mounted the combined retaining and releasing lever 4. The said lever 4 is furthermore provided with an outwardly-extending handle end 7, by which the lever can be operated to release the shutter when held in open position in a manner as hereinafter referred to.

The reference character 8 denotes the wall of a building, and to the said wall 8 is attached a spring-catch 9, which is adapted to engage and hold the shutter in open position, and above the said spring-catch 9 is arranged an abutment 10 to prevent the shutter contacting with the wall of the building and to also associate with the spring-catch 9, so that when the shutter is held in open position it will be prevented from rattling.

It will be assumed that the shutter is in closed position and the hooked end 3 of the lever in engagement with the keeper 2. Such position of the hooked end 3 with respect to the keeper 2 retains the shutter in closed position. When it is desired to open the shutter, the curvilinear hooked end 3 of the lever is grasped by the operator and pulled upwardly, the torsional yielding of the lever 4 during such operation permitting the hooked end 3 of the lever separating from the keeper 2. The shutter is then swung outwardly and the free end thereof passes over and upon the spring-catch 9, which retains the shutter in an open position. When it is desired to close the shutter, the handle end 7 of the lever is pressed downwardly, which causes the hooked end 3 of the lever to engage and depress the spring-catch 9, thereby moving said catch 9 out of the path of the shutter and permitting the shutter to be swung to closed position, so that the hooked end of the lever will ride over and engage the keeper 2 and retain the shutter in closed position. Owing to the position of the combined releasing and retaining lever with respect to the lower end of the shutter, when the latter is held in open position, the handle end 7 can be easily reached and conveniently operated by a person so that the spring-catch 9 can be depressed and the shutter released so that it can be moved to closed position.

Having thus fully described my invention, what I claim as new, and desire to secure by Letters Patent, is—

1. A shutter-fastener comprising a combined retaining and releasing lever having both of its ends free and secured intermediate its ends to the shutter and having one of its ends provided with a curvilinear hook, combined with a keeper adapted to be engaged by said hook for retaining the shutter in a closed position, an abutment to arrest the movement of the shutter when opening the same, and a spring-catch pivotally connected to the abutment and adapted to engage the shutter for retaining it in an open position, said spring-catch associating with said abutment to prevent the actuating of the shutter when retained in an open position by the catch, and said hooked end of the lever adapted to engage the catch when the lever is operated to release the shutter, thereby permitting of the closing of the shutter.

2. A shutter-fastener comprising a combined retaining and releasing lever, said lever having one end formed with a curvilinear hook and the other end formed with a handle, combined with a keeper adapted to be engaged by said hook for retaining the shutter in a closed position, and a spring-catch adapted to engage the shutter for retaining it in an open position, said hook of said lever adapted to engage and lower the catch when the lever is operated to release the shutter, thereby permitting of the closing of the shutter.

In testimony whereof I have hereunto set my hand in presence of two subscribing witnesses.

ALBERT D. BARTLETT.

Witnesses:
N. L. BOGAN,
GEO. W. REA.